(12) United States Patent
Hayashi

(10) Patent No.: US 8,289,564 B2
(45) Date of Patent: Oct. 16, 2012

(54) IMAGE PROCESSING DEVICE, AND METHOD AND COMPUTER READABLE MEDIUM FOR IMAGE PROCESSING

(75) Inventor: Akihiro Hayashi, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 694 days.

(21) Appl. No.: 12/410,866

(22) Filed: Mar. 25, 2009

(65) Prior Publication Data

US 2009/0251717 A1    Oct. 8, 2009

(30) Foreign Application Priority Data

Apr. 8, 2008    (JP) ................. 2008-100262

(51) Int. Cl.
*G06K 15/00*    (2006.01)
(52) U.S. Cl. .................................... 358/1.18
(58) Field of Classification Search ............. None
See application file for complete search history.

(56) References Cited

U.S. PATENT DOCUMENTS

| | | | | |
|---|---|---|---|---|
| 6,154,755 A | * | 11/2000 | Dellert et al. ............. | 715/202 |
| 2003/0123660 A1 | * | 7/2003 | Fletcher et al. ............. | 380/205 |
| 2005/0094206 A1 | * | 5/2005 | Tonisson ............. | 358/1.18 |

FOREIGN PATENT DOCUMENTS

| | | |
|---|---|---|
| JP | HEI 4-136870 | 5/1992 |
| JP | 2000-138815 | 5/2000 |
| JP | 2001-218017 | 8/2001 |
| JP | 2003-143389 | 5/2003 |
| JP | 2005-217598 | 8/2005 |
| JP | 2006-186857 | 7/2006 |
| JP | 2007-19928 | 1/2007 |
| JP | 2007-134762 | 5/2007 |
| JP | 2007-295143 | 11/2007 |
| JP | 2007-336528 | 12/2007 |

OTHER PUBLICATIONS

Japanese Official Action dated Jul. 6, 2010 together with an English language translation.

* cited by examiner

*Primary Examiner* — Marivelisse Santiago Cordero
*Assistant Examiner* — John Wallace
(74) *Attorney, Agent, or Firm* — Scully, Scott, Murphy & Presser, P.C.

(57) ABSTRACT

An image processing device configured to add, to a first image, a second image, includes an image acquiring unit configured to acquire the second image to be added, a segment sectioning unit configured to section, into a plurality of segments, an image forming area in which the first image is allowed to be formed on a sheet, a segment specifying unit configured to specify, from the plurality of segments, at least one segment into which the second image acquired is to be added, a size determining unit configured to determine a size of the second image such that the second image fits within the at least one segment specified, and an image combining unit configured to create a combined image by adding the second image of the determined size to be formed in the at least one segment to the first image to be formed in the image forming area.

12 Claims, 13 Drawing Sheets

WM, R1

WM, R1

IMAGE PROCESSING DEVICE, AND METHOD AND COMPUTER READABLE MEDIUM FOR IMAGE PROCESSING

CROSS-REFERENCE TO RELATED APPLICATION

This application claims priority under 35 U.S.C. §119 from Japanese Patent Application No. 2008-100262 filed on Apr. 8, 2008. The entire subject matter of the application is incorporated herein by reference.

BACKGROUND

1. Technical Field

The following description relates to one or more image processing techniques in which a watermark to be added to an image can be formed from an arbitrary image.

2. Related Art

An image forming device has been known, which has a function to add a watermark of a character string or a graphic image to an image acquired externally or from an internal scanner unit.

The watermark is, in most cases, employed as graphics such as a corporate logo or employed as a character string printed such as "COPY INHIBIT," "FOR INTERNAL USE ONLY," and "CONFIDENTIAL."

In addition, Japanese Patent Provisional Publication No. 2003-143389 (hereinafter, simply referred to as '389 Publication) discloses an image forming device adapted to use an image scanned by a scanner unit as a watermark.

SUMMARY

However, in the image forming device disclosed in '389 Publication, when an image scanned by the scanner unit is used as a watermark to be added, a user is required to specify a position where the watermark is to be located. Further, the user is required to determine the size of the watermark, and thus the watermark might not completely fit within a sheet, and it may give a bad visual impression. Moreover, when the user wishes to add an arbitrary number of watermarks, it is inconvenient for the user to have to adjust the sizes of the watermarks such that the watermarks fit within a sheet.

Aspects of the present invention are advantageous to provide one or more improved image processing devices, methods, and computer readable media that make it possible to use an acquired image as an added image such as a watermark and to automatically add the added image to each of at least one segment on a sheet with the size of the added image automatically adjusted to fit within each of the at least one segment.

According to aspects of the present invention, an image processing device is provided, which is configured to add, to a first image, a second image. The image processing device includes an image acquiring unit configured to acquire the second image to be added, a segment sectioning unit configured to section, into a plurality of segments, an image forming area in which the first image is allowed to be formed on a sheet, a segment specifying unit configured to specify, from the plurality of segments, at least one segment into which the second image acquired is to be added, a size determining unit configured to determine a size of the second image such that the second image fits within the at least one segment specified, and an image combining unit configured to create a combined image by adding the second image of the determined size to be formed in the at least one segment to the first image to be formed in the image forming area.

In some aspects of the present invention, the image forming area in which the first image can be formed on the sheet is sectioned into a plurality of segments. Then, the second image acquired is added to at least one segment specified among the plurality of segments. Therefore, the user is not required to set a position where the second image is to be added. Furthermore, the size of the second image to be added is adjusted such that the second image fits within the at least one segment specified. Thus, the user is not required to set the size of the second image, and it results in an easy operation of adding the second image. Moreover, it is possible to create a combined image with the second image that fits within the at least one segment specified on the sheet, which combined image gives a good visual impression.

According to aspects of the present invention, further provided is a method for adding, to a first image, a second image. The method includes an image acquiring step of acquiring the second image to be added, a segment sectioning step of sectioning, into a plurality of segments, an image forming area in which the first image is allowed to be formed on a sheet, a segment specifying step of specifying, from the plurality of segments, at least one segment into which the second image acquired is to be added, a size determining step of determining a size of the second image such that the second image fits within the at least one segment specified, and an image combining step of creating a combined image by adding the second image of the determined size to be formed in the at least one segment to the first image to be formed in the image forming area.

In some aspects of the present invention, the method adapted as above can present the same effects as the aforementioned image processing device.

According to aspects of the present invention, further provided is a computer readable medium having computer readable instructions stored thereon for adding, to a first image, a second image. The instructions cause a computer to perform an image acquiring step of acquiring the second image to be added, a segment sectioning step of sectioning, into a plurality of segments, an image forming area in which the first image is allowed to be formed on a sheet, a segment specifying step of specifying, from the plurality of segments, at least one segment into which the second image acquired is to be added, a size determining step of determining a size of the second image such that the second image fits within the at least one segment specified, and an image combining step of creating a combined image by adding the second image of the determined size to be formed in the at least one segment to the first image to be formed in the image forming area.

In some aspects of the present invention, the computer readable medium adapted as above can present the same effects as the aforementioned image processing device.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

An embodiment in which aspects of the present invention are applied to a multi-function image forming device will be described with reference to the accompanying drawings. The multi-function image forming device has been commonly known, which is provided with a facsimile function, a printer function, a copy function, and a scanner function.

<External Configuration>

Figure 1:
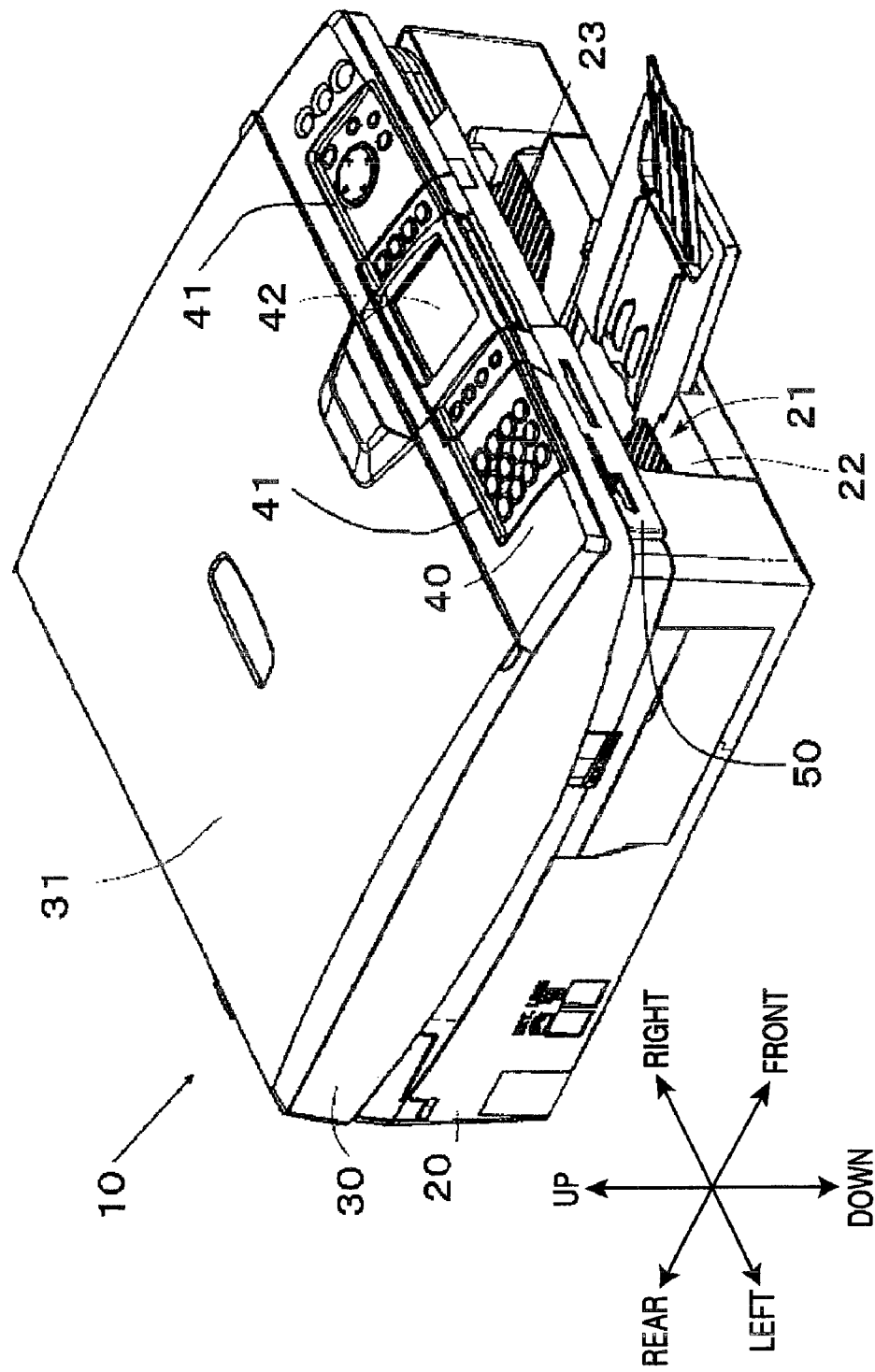
FIG. 1 is a perspective view showing an external configuration of an image forming device in an embodiment according to one or more aspects of the present invention.

FIG. 1 is a perspective view showing an external configuration of an image forming device 10 in an embodiment according to aspects of the present invention. As shown in FIG. 1, the image forming device 10 includes a printer unit 20 provided at a lower region thereof, a scanner unit 30 provided at an upper region thereof, an operation panel 40 provided at an upper front region thereof, and a slot unit 50 provided at a front region thereof. The printer unit 20 has an opening 21 on a front face of the image forming device 10. At the opening 21, a sheet feed tray 22 and a catch tray 23 are provided in a fashion arranged in a vertical direction. The sheet feed tray 22 is configured to be loaded with a stack of recording sheets. A recording sheet placed on the sheet feed tray 22 is fed to the inside of the printer unit 20 and thereafter discharged to the catch tray 23 with a desired image printed thereon.

The scanner unit 30 is a flatbed scanner. A document cover 31 is provided as a top cover of the image forming device 10. Under the document cover 31, a platen glass (not shown) is provided. A preparation for scanning a document sheet is completed by opening up the document cover 31, placing the document sheet on the platen glass, and closing the document cover 31. Then, when a user issues an instruction to scan the document sheet, an image on the document sheet is scanned by an image sensor (not shown) provided beneath the platen glass. For example, when a main image is written on the document sheet which main image is configured as an aggregation of characters, marks, signs, and numerals, the main image is scanned by the scanner unit 30.

The operation panel 40 is configured with a keyboard 41 and a display unit 42 such as an LCD. The keyboard 41 includes various buttons such as numeric buttons, a start button, and functional operation buttons. The display unit 42 is configured to display a function selecting screen through which the user designates an intended function to be executed. Additionally, the display unit 42 is adapted to display an operation procedure and the state of a process in execution, and to display information corresponding to a user operation through the keyboard 41.

The user can carry out setting or operations of various functions by operating the operation panel 40. For instance, through the operation panel 40, the user can issue an instruction to configure settings of the size and the type of a recording sheet, and the setting of a single-side printing mode or a double-side printing mode.

Furthermore, especially, in the embodiment, a watermark function is provided as a part of the copy function. The watermark function is a function to print, on a recording sheet, an image stored on a below-mentioned compact memory card, an image scanned by the scanner unit 30 from a document sheet, or a frequently-used predetermined image previously stored on a below-mentioned EEPROM 84, as a watermark in a manner combined with the main image scanned by the scanner unit 30 from a document sheet. A user instruction to achieve the watermark function is inputted through the operation panel 40.

The slot unit 50 is configured such that any of various compact memory cards as storage media can be inserted thereinto. For example, when the user performs an operation through the operation panel 40 in the state where a compact memory card is inserted in the slot unit 50, image data stored on the compact memory card can be read out. Then, the image data read out can be displayed on the display unit 42 or printed on a recording sheet.

<Electrical Configuration>

Figure 2:
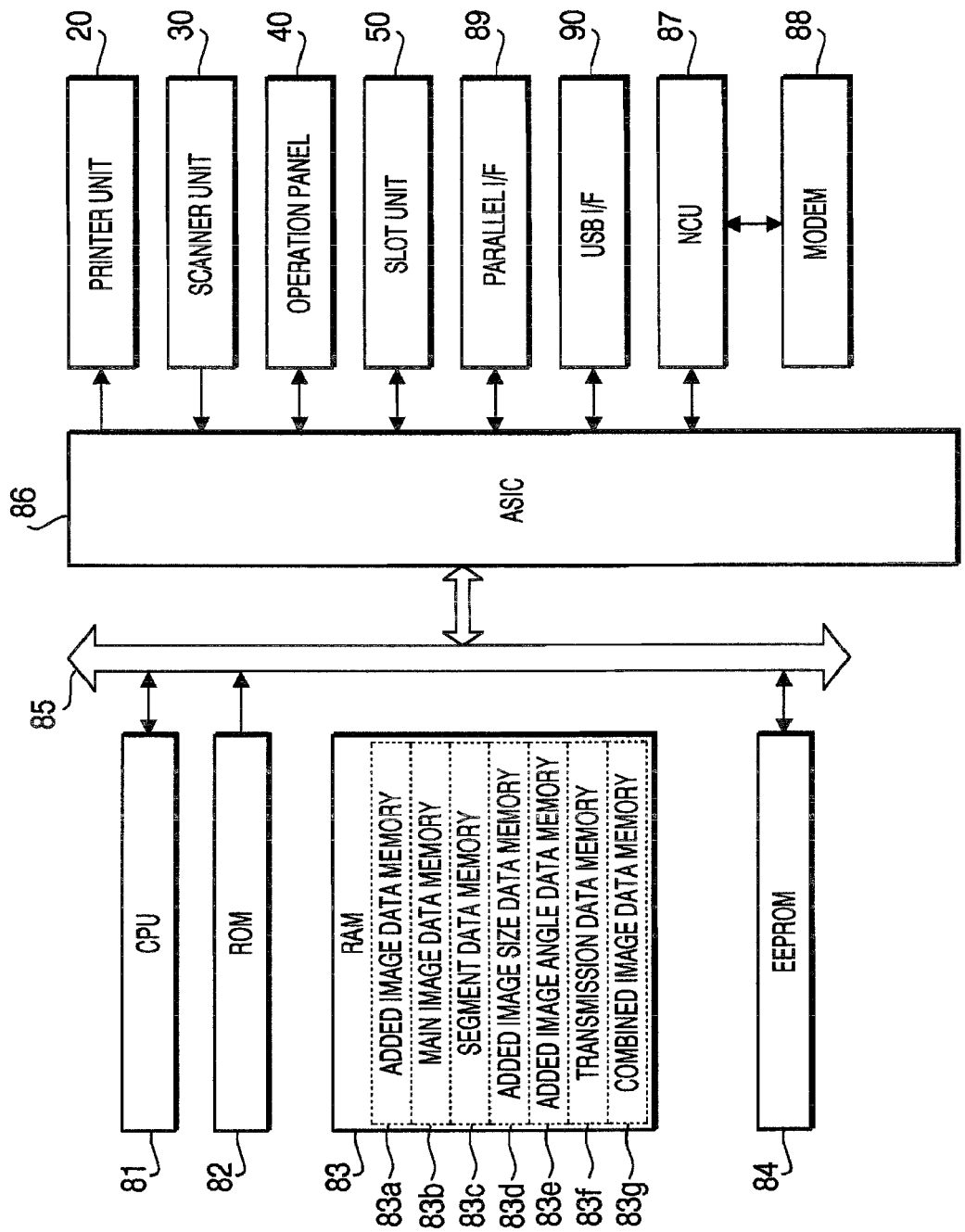
FIG. 2 is a block diagram showing an electrical configuration of the image forming device in the embodiment according to one or more aspects of the present invention.

Subsequently, referring to FIG. 2, an electrical configuration of the image forming device 10 will be described. FIG. 2 is a block diagram showing an electrical configuration of the image forming device 10. The image forming device 10 is provided with a microcomputer that includes a CPU 81, a ROM 82, a RAM 83, and an EEPROM 84. The CPU 81 is linked with an ASIC 86 via a bus 85.

The CPU 81 is configured to take control of each function of the image forming device 10 or each element connected with the ASIC 86 in accordance with setting values and programs stored on the ROM 82 and/or RAM 83 or various signals transmitted or received via a Network Control Unit (NCU) 87.

The ROM 82 stores thereon programs for controlling various operations of the image forming devices 10. For instance, the ROM 82 stores thereon a program that causes the image forming device 10 to perform a main process shown in a flowchart of FIG. 3 for combining an added image and the main image and printing the combined image.

The RAM 83 is employed as a working area or a memory area to temporarily store various kinds of data used when the CPU 81 executes the programs. Further, to the RAM 83, various memory areas are assigned, such as an added image data memory 83a, a main image data memory 83b, a segment data memory 83c, an added image size data memory 83d, an added image angle data memory 83e, a transmission data memory 83f, and a combined image data memory 83g.

The added image data memory 83a is an area to temporarily store data of an added image to be printed as a watermark on a recording sheet when the watermark included in the copy function is used. The main image data memory 83b is an area to temporarily store data of the main image to be printed on the recording sheet in a manner combined with the added image as a watermark. The segment data memory 83c is an area to temporarily store a plurality of segments on the recording sheet where the added image as stored is added. The added image size data memory 83d is an area to temporarily store the size of the added image as stored that is determined depending on the sizes of the segments stored in the segment data memory 83c. The added image angle data memory 83e is an area to temporarily store the angle of the added image as set. The transmission data memory 83f is an area to temporarily store a transmission factor for the added image as set. The combined image data memory 83g is an area to temporarily store data of the combined image to be printed on the recording sheet by the watermark function.

The EEPROM 84 is configured to store settings and flags to be held after the image forming device is powered off. For instance, the EEPROM 84 can store an added image acquired from the slot unit 50. Thereby, the added image once acquired can be repeatedly used. Moreover, as mentioned above, the EEPROM 84 stores the frequently-used predetermined added image.

The ASIC 86 is configured to take control of peripheral units connected therewith such as the printer unit 20 in accordance with a command issued by the CPU 81.

The printer unit 20 forms an image on a recording sheet in response to a print command signal issued by the ASIC 86. The scanner unit 30 scans images and/or characters on a document sheet in response to a scan command signal issued by the ASIC 86, and sends the scanned image data to the ASIC 86. The operation panel 40 detects an operational state of the keyboard 41 thereof in response to a detection command signal issued by the ASIC 86, and transmits the detected operational state to the ASIC 86. Further, the operation panel 40 supplies image display data to the display unit 42 in response to a command signal issued by the ASIC 86. The slot unit 50 reads out image data stored on a compact memory card inserted therein in response to a read-out command signal issued by the ASIC 86, and transmits the image data read out to the ASIC 86.

The ASIC 86 is joined with the NCU 87. The NCU 87 is configured to receive a communication signal through a public line. A modem 88 is configured to demodulate the communication signal received and to transmit the demodulated signal to the ASIC 86. In addition, when the ASIC 86 transmits image data via facsimile transmission, the modem 88 modulates the image data into communication signals, and transmits the communication signals to the public line via the NCU 87.

A parallel interface 89 is configured to perform data communication with an external device such as a personal computer via a parallel cable in response to a communication control signal issued by the ASIC 86. A USB interface 90 is configured to perform data communication with an external device such as a personal computer via a USB cable in response to a communication control signal issued by the ASIC 86.

<Operations in Embodiment>

Figure 12:
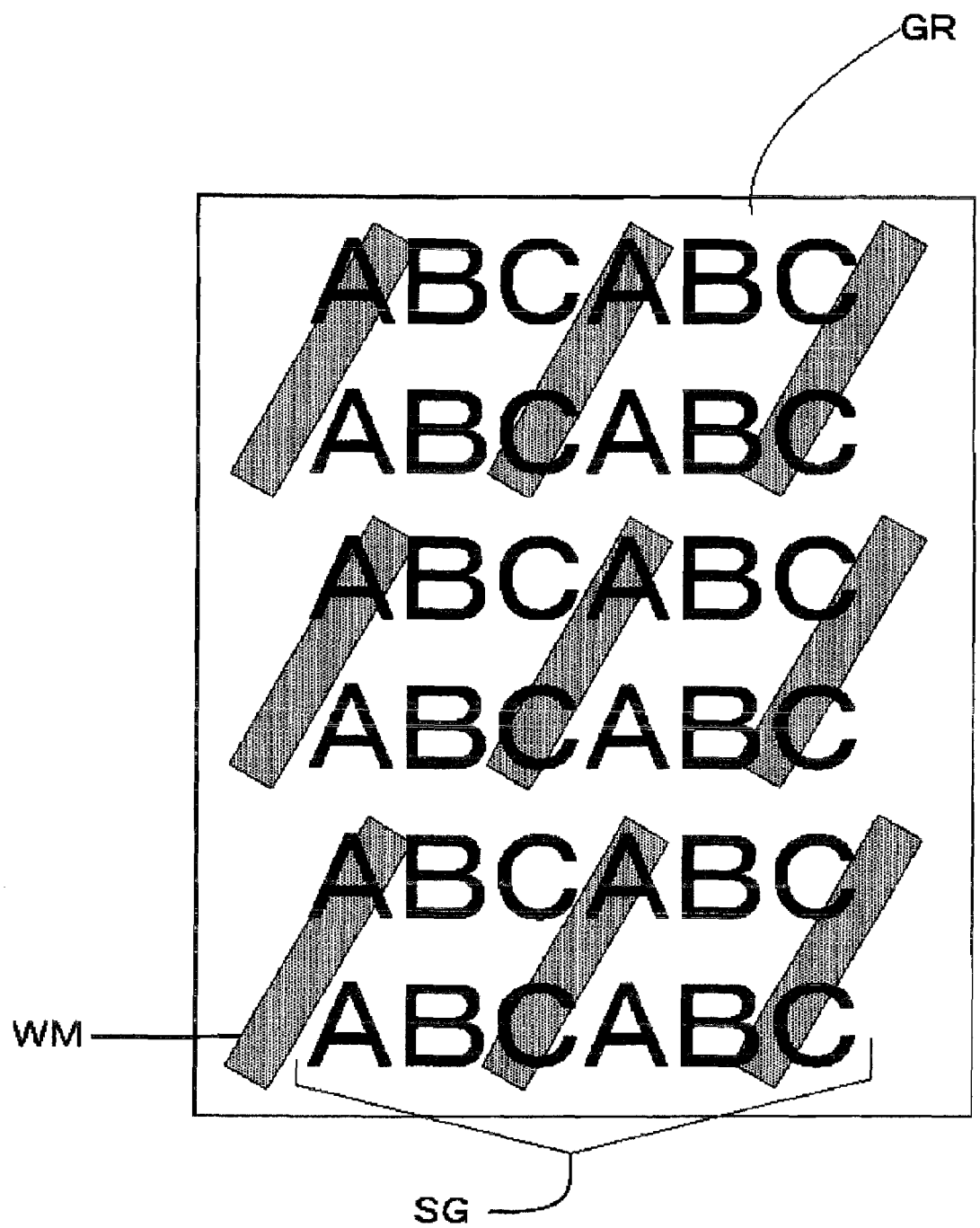
FIG. 12 shows a combined image created by combining a main image and the added image on the image forming area evenly sectioned in the embodiment according to one or more aspects of the present invention.
Figure 13:
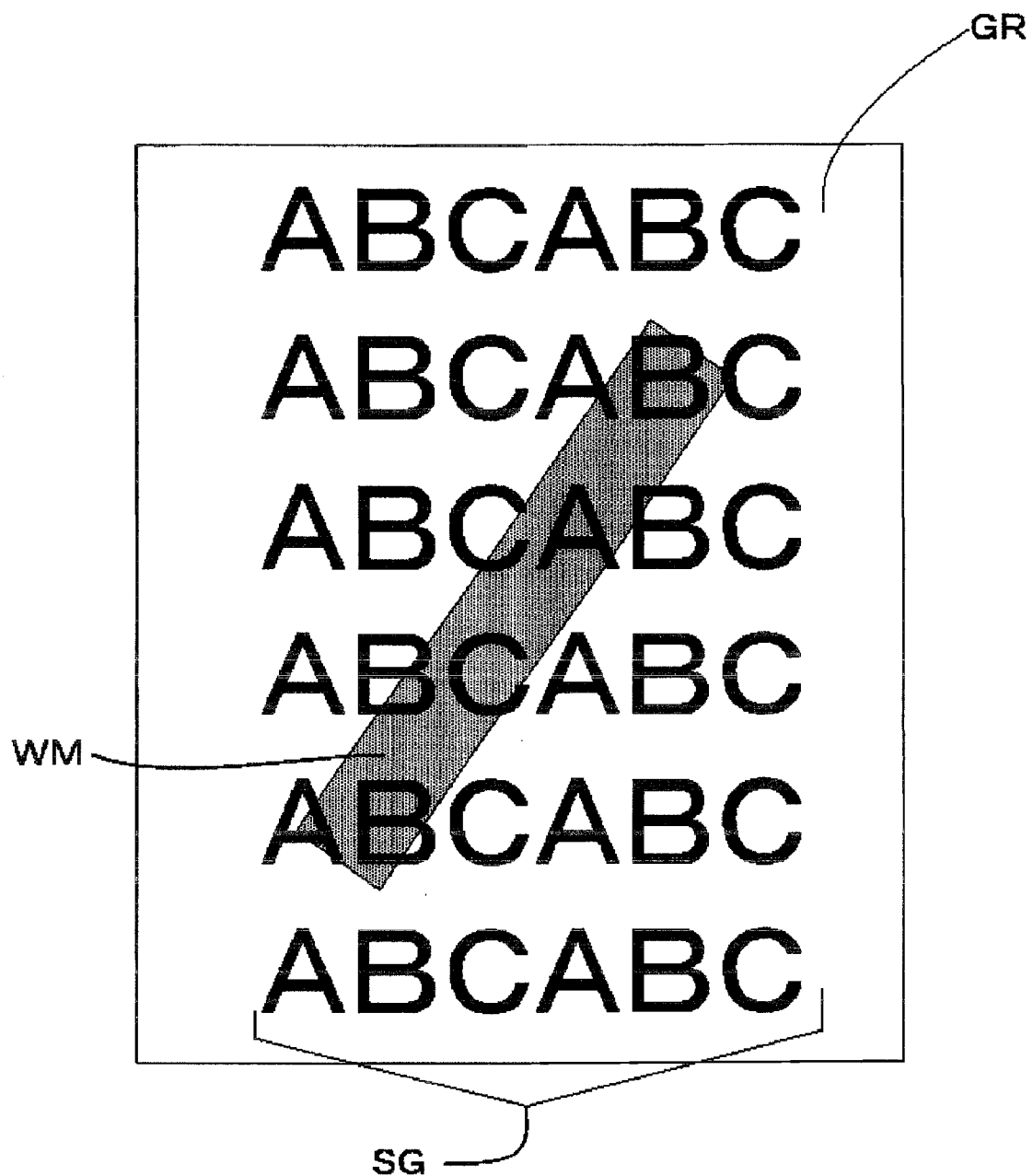
FIG. 13 shows a combined image created by combining the main image and the added image added into only a central segment among segments into which the image forming area is unevenly sectioned in the embodiment according to one or more aspects of the present invention.
Figure 14:
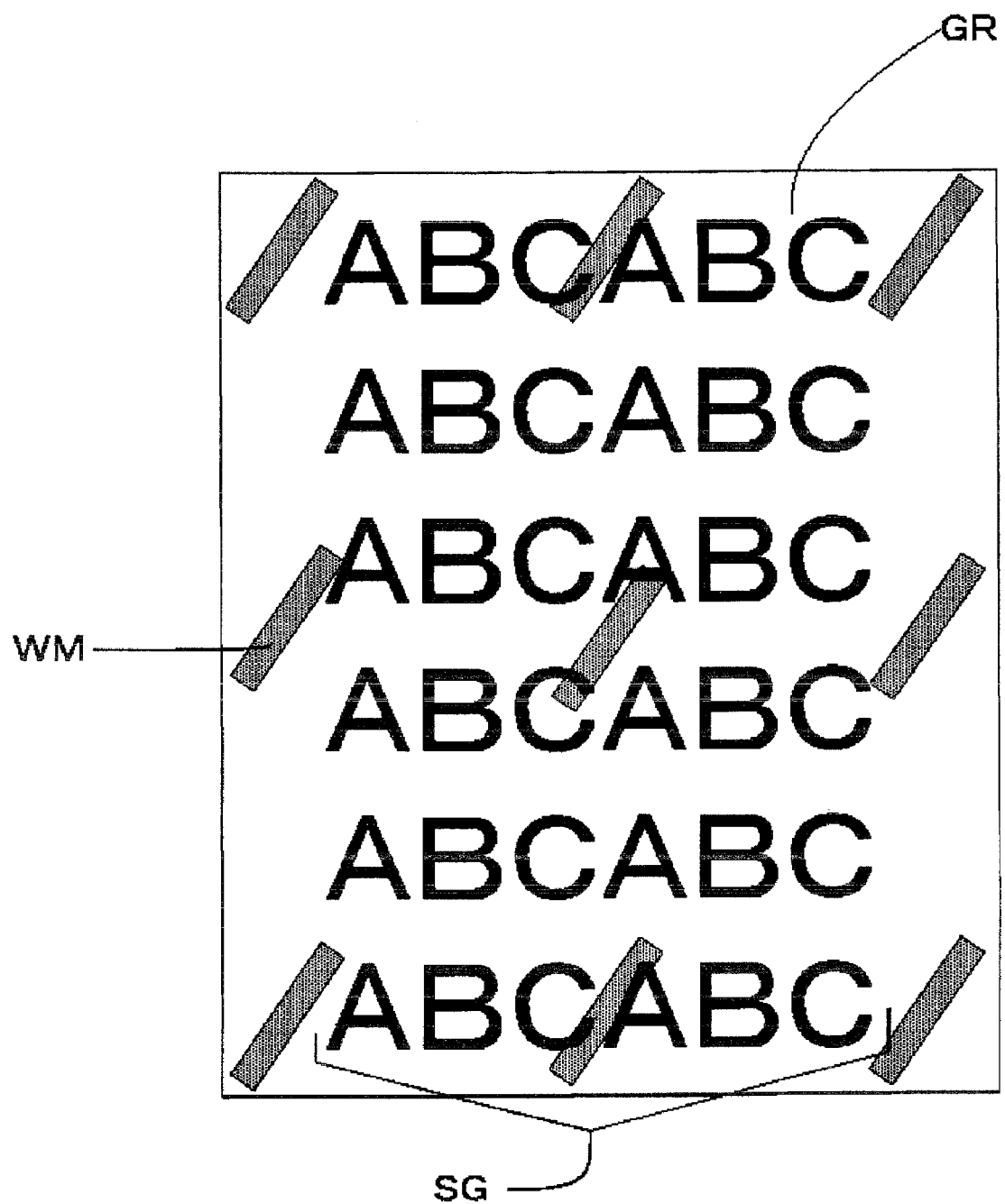
FIG. 14 shows a combined image created by combining the main image and the added image added into all segments into which the image forming area is unevenly sectioned in the embodiment according to one or more aspects of the present invention.

Hereinafter, operations by the image forming device 10 of the embodiment will be explained with reference to FIGS. 3 to 14. Here, it is noted that FIG. 12 schematically shows combined image data stored in the combined image data memory 83g when even segmentation is selected in S41 (S41: Yes). Further, FIG. 13 schematically shows combined image data stored in the combined image data memory 83g when uneven segmentation is selected in S41 (S41: No) and it is determined in S44 that an added image is added into only a central segment (S44: Yes). FIG. 14 schematically shows combined image data stored in the combined image data memory 83g when uneven segmentation is selected in S41 (S41: No) and it is determined in S44 that an added image is added into all segments (S44: No). An added image WM stored in the added image data memory 83a and a main image SG stored in the main image data memory 83b are written in an image forming area GR (see FIG. 7).

(Main Process)

Figure 3:
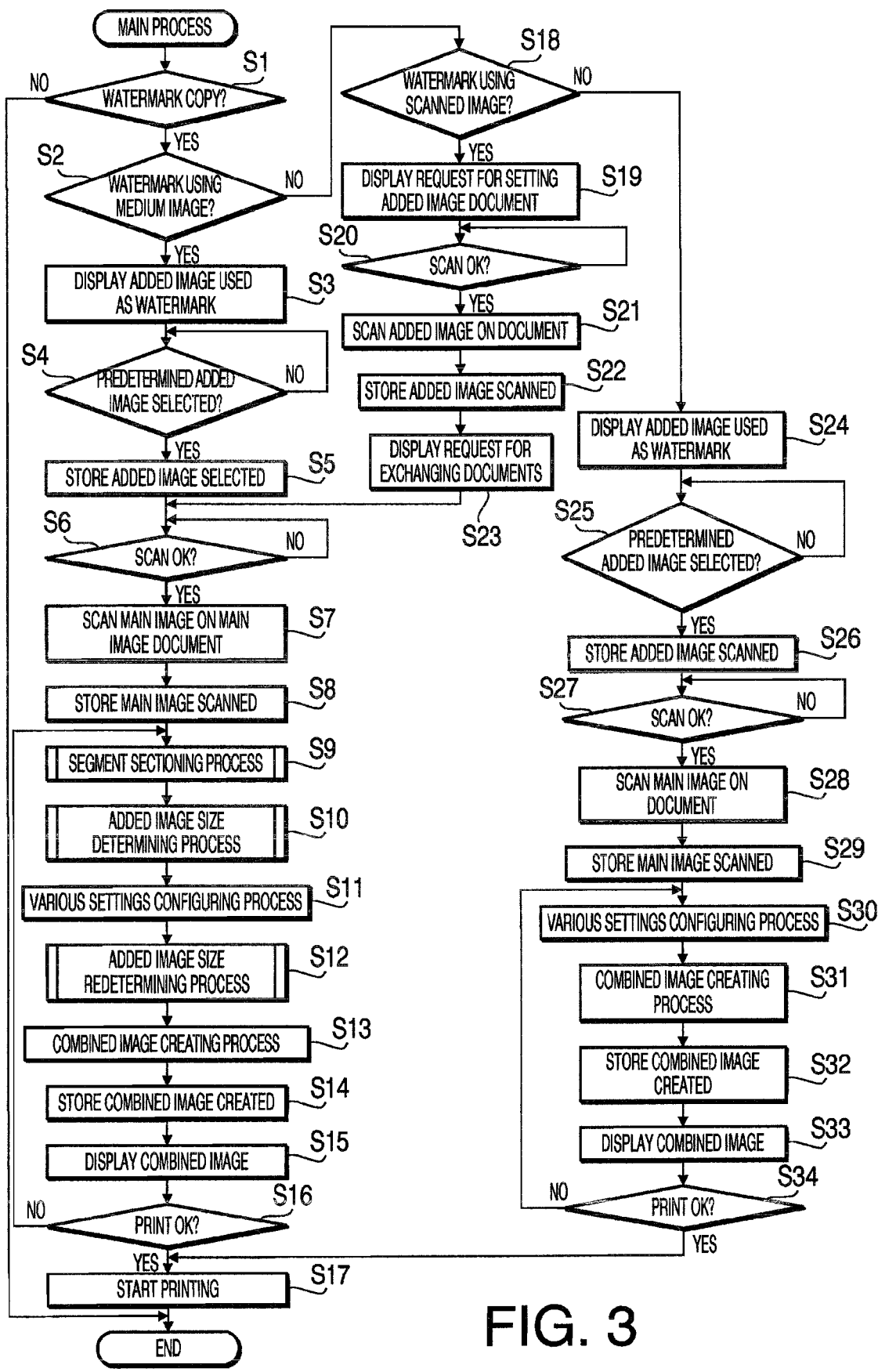
FIG. 3 is a flowchart showing a main process by the image forming device in the embodiment according to one or more aspects of the present invention.

Initially, referring to FIG. 3, an explanation will be given to describe a main process for a watermark copy to be executed by the CPU 81 of the image forming device 10. FIG. 3 is a flowchart showing a procedure of the main process by the image forming device 10. The main process is executed when the copy function is selected through a user operation of the operation panel 40 from the various functions such as the facsimile function, the printer function, the scanner function, and the copy function. Especially, the main process can utilize an image acquired from the scanner unit 30 or an external device as a watermark, and includes an operation of adding the watermark to each of a plurality of segments sectioned on a recording sheet. Further, the main process includes an operation of adjusting the size of the watermark added to each segment to conform to the size of each segment. The operations result in that the user is not required to set the positions and the sizes of the watermark to be added. Additionally, the operations make it possible to generate a good-looking combined image. Thus, the operations present improved user-friendliness and convenience to the user adding a watermark.

In the main process, firstly, it is determined whether a watermark copy is selected (S1). In the embodiment, when the user selects the copy function, the display unit 42 displays a request for selecting one of copy classifications such as a watermark copy, a normal copy, and a double-side copy, and it is determined whether the watermark copy is selected from the above copy classifications. When the watermark is not selected (S1: No), the main process is terminated. After the main process is terminated, the image forming device 1 performs other functions such as the facsimile function with known techniques (known units) until the copy function is selected.

Meanwhile, when the watermark copy is selected (S1: Yes), it is determined whether an added image is a watermark using a medium image (S2). In the embodiment, when the user selects the watermark copy, the CPU 81 causes the display unit 42 to display a request for selecting an added image used as a watermark from the medium image and a scanned image acquired from the scanner unit 30, and it is determined whether the medium image is selected from the both images.

When the medium image is selected (S2: Yes), the CPU 81 causes the display unit 42 to display added images stored on a memory card inserted in the slot unit 50 as possible watermarks (S3).

The CPU 81 waits for a desired added image to be selected from the possible watermarks displayed on the display unit 42 (S4: No). When a desired added image is selected (S4: Yes), the added image selected is stored into the added image data memory 83a (S5).

Thereafter, it is determined whether the user inputs "Scan OK" through the keyboard 41 (S6). The CPU 81 waits for "Scan OK" to be inputted (S6: No). When "Scan OK" is inputted (S6: Yes), the CPU 81 initiates the scanner unit 30 and controls the scanner unit 30 to scan a main image on a main image document placed on the platen glass (S7). Then, the main image scanned is stored into the main image data memory 83b (S8).

Subsequently, a segment sectioning process is performed to determine the number of segments where the added image is added on the recording sheet (S9). The segment sectioning process will be described in detail later.

When the number of segments where the added image is added on the recording sheet is determined in S9, a below-mentioned added image size determining process is performed to determine the size of the added image (S10). The added image size determining process is a process for determining the size of the added image to be added to the main image formed on the recording sheet depending on the sizes of the segments of which the number is determined in S9. The added image size determining process will be described in detail later.

Next, in order to create a combined image by adding the added image acquired in S5 to the main image acquired in S8, a various settings configuring process is first carried out (S11). In the various settings configuring process, an angle and a transmission factor of the added image relative to the main image are set. For example, a display for specifying the angle of the added image is shown on the display unit 42, and the angle of the added image is set by a user operation through the keyboard 41. The set angle of the added image is stored in the added image angle data memory 83e. Additionally, any value within a range from "0%" up to "100%" is set as a transmission factor of the added image by a user operation through the keyboard 41, and the set value is displayed on the display unit 42. The set transmission factor is stored in the transmission data memory 83f. The number acquired in S9 is set as the number of the segments where the added image is added. Further, the size acquired in S10 is set as the size of the added image. It is noted that the transmission factor is a value representing a darkness level of an image.

Based on the various settings configuring process performed in S11, an added image size redetermining process is executed to redetermine the size of the added image (S12). The added image size redetermining process will be described in detail below.

Thus, based on the settings configured in the steps S9 to S12, a combined image to be printed on the recording sheet is created (S13). Then, data of the combined image created is stored into the combined image data memory 83g (S14). Incidentally, FIGS. 12 to 14 exemplify combined images stored in the combined image data memory 83g.

Subsequently, the combined image stored in the combined image data memory 83g is displayed on the display unit 42 (S15). It is determined whether the user inputs "Print OK" through the keyboard 41 (S16). When it is determined that the user does not input "Print OK" (S16: No), the steps S9 to S16 are repeated. Meanwhile, when it is determined that the user inputs "Print OK" (S16: Yes), printing is performed to print the combined image on the recording sheet (S17).

In the meantime, in S2, when the medium image is not selected (S2: No), it is determined whether the added image is a watermark using a scanned image (S18). When the added image is a watermark using a scanned image (S18: Yes), the display unit 42 displays a request for setting an added image document on which an added image to be used as a watermark is written (S19).

Next, it is determined whether the user input "Scan OK" through the keyboard 41 (S20). The CPU 81 waits for "Scan OK" to be inputted (S20: No). When "Scan OK" is inputted (S20: Yes), the CPU 81 initiates the scanner unit 30 and controls the scanner unit 30 to scan the added image written on the added image document placed on the platen glass (S21). Then, the added image scanned is stored into the added image data memory 83a (S22).

Subsequently, the display unit 41 displays a request for replacing the added image document with a main image document on which a main image is written (S23). Thereafter, the present process goes to the aforementioned step S6.

Meanwhile, when it is determined in S18 that the added image is not a watermark using a scanned image (S18: No), the CPU 81 determines that an added image previously stored on the EEPROM 84 is to be used as a watermark, and causes the display unit 42 to display thereon added images stored on the EEPROM 84 as possible watermarks (S24).

The CPU 81 waits for a desired added image to be selected from the possible watermarks displayed on the display unit 42 (S25: No). When a desired added image is selected (S25: Yes), the added image selected is stored into the added image data memory 83a (S26).

Next, it is determined whether the user inputs "Scan OK" through the keyboard 41 (S27). At this time, the CPU 81 waits for "Scan OK" to be inputted (S27: No). When "Scan OK" is inputted (S27: Yes), the CPU 81 initiates the scanner unit 30 and controls the scanner unit 30 to scan the main image written on the main image document placed on the platen glass (S28). Thereafter, the main image scanned is stored into the main image data memory 83b (S29).

Here, in order to create a combined image by adding the added image acquired in S26 to the main image acquired in S29, a various settings configuring process similar to the aforementioned various settings configuring process in S11 are performed (S30). Then, based on settings configured in the various settings configuring process, a combined image to be printed on the recording sheet is created (S31). The combined image created is stored into the combined image data memory 83e (S32).

Subsequently, the combined image stored in the combined image data memory 83g is displayed on the display unit 42 (S33). Then it is determined whether the user inputs "Print OK" through the keyboard 41 (S34). When it is determined that the user does not inputs "Print OK" (S34: No), the steps S30 to S34 are repeated. Meanwhile, when it is determined that the user inputs "Print OK" (S34: Yes), printing is performed (S17), and thereafter the main process is terminated.

(Segment Sectioning Process)

Figure 4:
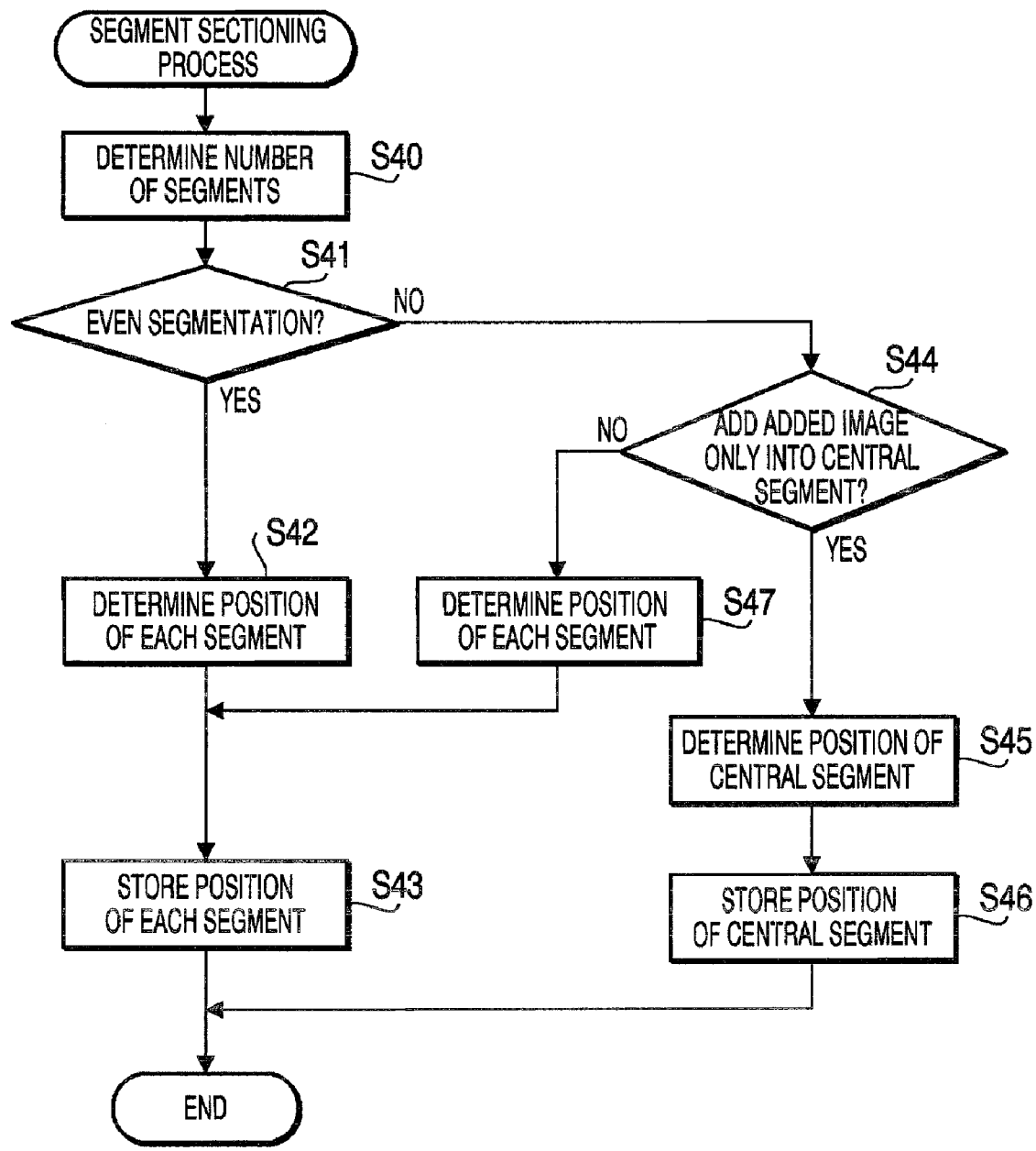
FIG. 4 is a flowchart showing a segment sectioning process by the image forming device in the embodiment according to one or more aspects of the present invention.

Hereinafter, a segment sectioning process of the embodiment will be described in detail with reference to FIG. 4. FIG. 4 is a flowchart showing a detailed procedure of the segment sectioning process executed in S9.

The segment sectioning process first determines the number of segments on the recording sheet into each of which the added image is added (S40). For example, the display unit 42 shows a display to designate the number of the segments into each of which the added image is added, and the number of the segments is set by a user operation through the keyboard 41. The user can arbitrarily set the number of the segments, e.g., 4 segments, 5 segments, etc.

Next, it is determined whether the segments are evenly sectioned (S41). In the embodiment, after the user determines the number of the segments, the CPU 81 causes the display unit 42 to display a request for selecting either evenly sectioned segments or unevenly sectioned segments, and determines whether the user selects the evenly sectioned segments.

When the even segmentation is selected, namely, when it is determined that the segments are evenly sectioned (S41: Yes), the CPU 81 determines the position of each segment on an image forming area GR illustrated in FIG. 7 (S42). The image forming area GR is determined based on the size of the recording sheet that is set by a user operation through the operation panel 40.

Figure 7:
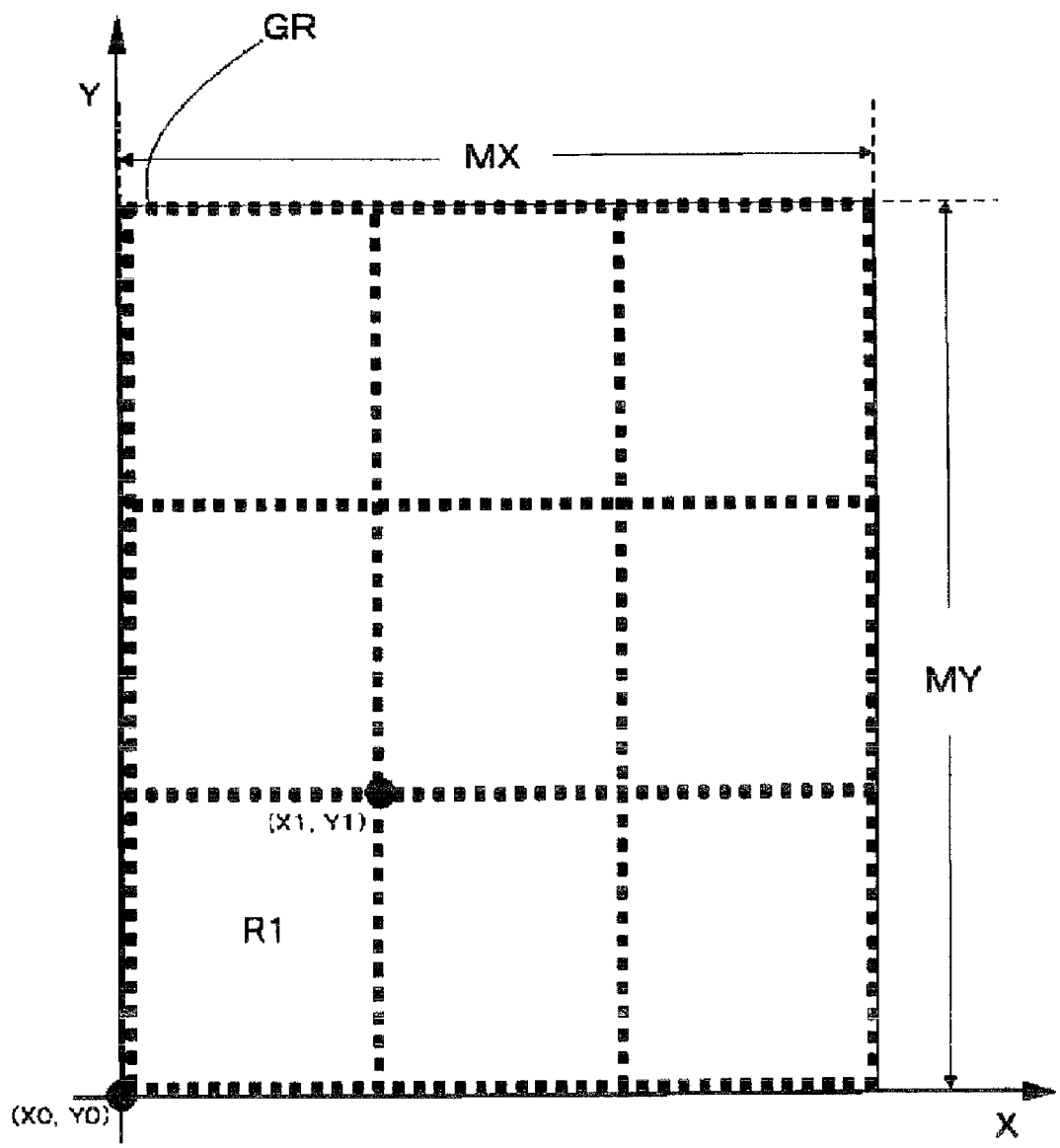
FIG. 7 illustrates a method for determining the position of each of evenly sectioned segments in an image forming area in the embodiment according to one or more aspects of the present invention.

FIG. 7 illustrates a method for determining the position of each segment in the case where the number of the segments is determined to be 9 and even segmentation is selected. The position of a segment on the image forming area GR is represented by the X-Y coordinates of two diagonally-located vertexes of the segment. The coordinates of two vertexes of a segment R1 are (X0, Y0) and (X1, Y1). In order to determine the coordinates of the two vertexes, a calculation is made to determine the lengths of the segment R1 in directions of X axis and Y axis. Lengths in the directions of X axis and Y axis are determined based on the image forming area GR determined based on the size of the recording sheet and the number of the segments in each of a main scanning direction and an auxiliary scanning direction perpendicular to the main scanning direction. For example, when a recording sheet designated is of A4 size, the lengths of the image forming area GR in the main scanning direction and the auxiliary direction are assumed to be MX and MY, respectively. The number of the segments in the main scanning direction is "3," and thus the length of the segment R1 in the main scanning direction is MX/3. In the same way, the length of the segment R1 in the auxiliary direction is MY/3. Therefore, when vertex coordinates (X0, Y0) are defined as an original point (0, 0), the coordinates of the two vertexes of the segment R1 on the image forming area GR are determined to be (0, 0) and (MX/3, MY/3). Thereby, the position of the segment R1 on the image forming area GR is calculated. The same calculation is made for each of the other segments, and the position of each segment is determined.

Further, it is noted that the position of the added image added into each segment is the central position of each segment. For instance, the coordinates of the central position of the segment R1 are (MX/6, MY/6). The added image is added into the segment R1 with the coordinates (MX/6, MY/6) as a center.

It is noted that, when the even segmentation is selected in S41, the added image is added into all the segments.

Then, the position of each segment is stored into the segment data memory 83c (S43). Thus, the position of each segment is determined, and the segment sectioning process is terminated.

Meanwhile, when uneven segmentation is selected, namely, when it is determined that the segments are not evenly sectioned (S41: No), it is determined whether the added image is added into only a segment located in the center of the plural segments (S44). In the embodiment, when the user selects the uneven segmentation, the CPU 81 causes the display unit 42 to display a request for selecting either adding the added image into only the central segment the largest among all the segments or adding the added image into all the segments, and determines whether the user selects the adding the added image into only the central segment.

When the adding the added image into only the central segment is selected (S44: Yes), a calculation is made to determine only the position of the segment located in the center of the image forming area GR (S45).

Figure 8:
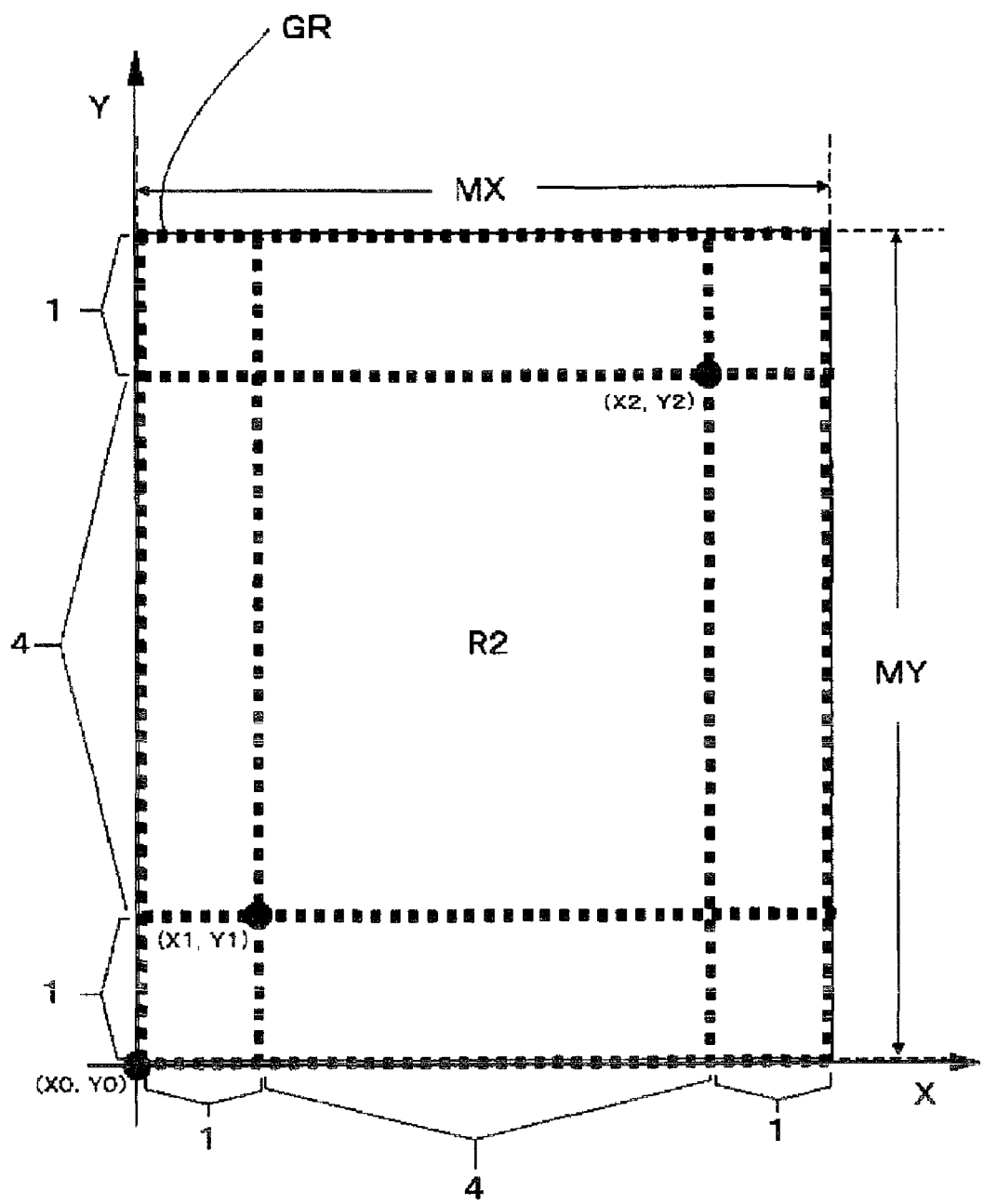
FIG. 8 illustrates a method for determining the position of a central segment among unevenly sectioned segments in the image forming area in the segment sectioning process of the embodiment according to one or more aspects of the present invention.

FIG. 8 illustrates a method for calculating the position of a segment in the case where the number of segments is determined to be 9, the uneven segmentation is selected, and the added image is added into only the central segment. The position of a segment on the image forming area GR is represented by the X-Y coordinates of two diagonally-located vertexes of the segment. The coordinates of two vertexes of a central segment R2 are (X1, Y1) and (X2, Y2). In order to determine the coordinates of the two vertexes, a calculation is made to determine the lengths of the segment R2 in the directions of X axis and Y axis. Lengths in the directions of X axis and Y axis are determined based on the image forming area GR determined based on the size of the recording sheet, the number of the segments in each of a main scanning direction and an auxiliary scanning direction, and a predetermined segmentation ratio employed when the uneven segmentation is selected. For example, when a recording sheet designated is of A4 size, the lengths of the image forming area GR in the main scanning direction and the auxiliary direction are assumed to be MX and MY, respectively. The number of the segments in the main scanning direction is "3," and in this case, a segmentation ratio is defined to be 1:4:1. Thus the length of the segment R2 in the main scanning direction is 4MX/3. In the same way, the length of the segment R2 in the auxiliary direction is 4MY/3. Therefore, when the vertex coordinates (X0, Y0) are defined as an original point (0, 0), the coordinates of the two vertexes of the segment R2 on the image forming area GR are determined to be (MX/6, MY/6) and (5MX/6, 5MY/6). Thereby, the position of the segment R2 on the image forming area GR is calculated.

Then, the position of the central segment is stored into the segment data memory 83c (S46). Thus, the position of the central segment is determined, and the segment sectioning process is terminated.

Figure 9:
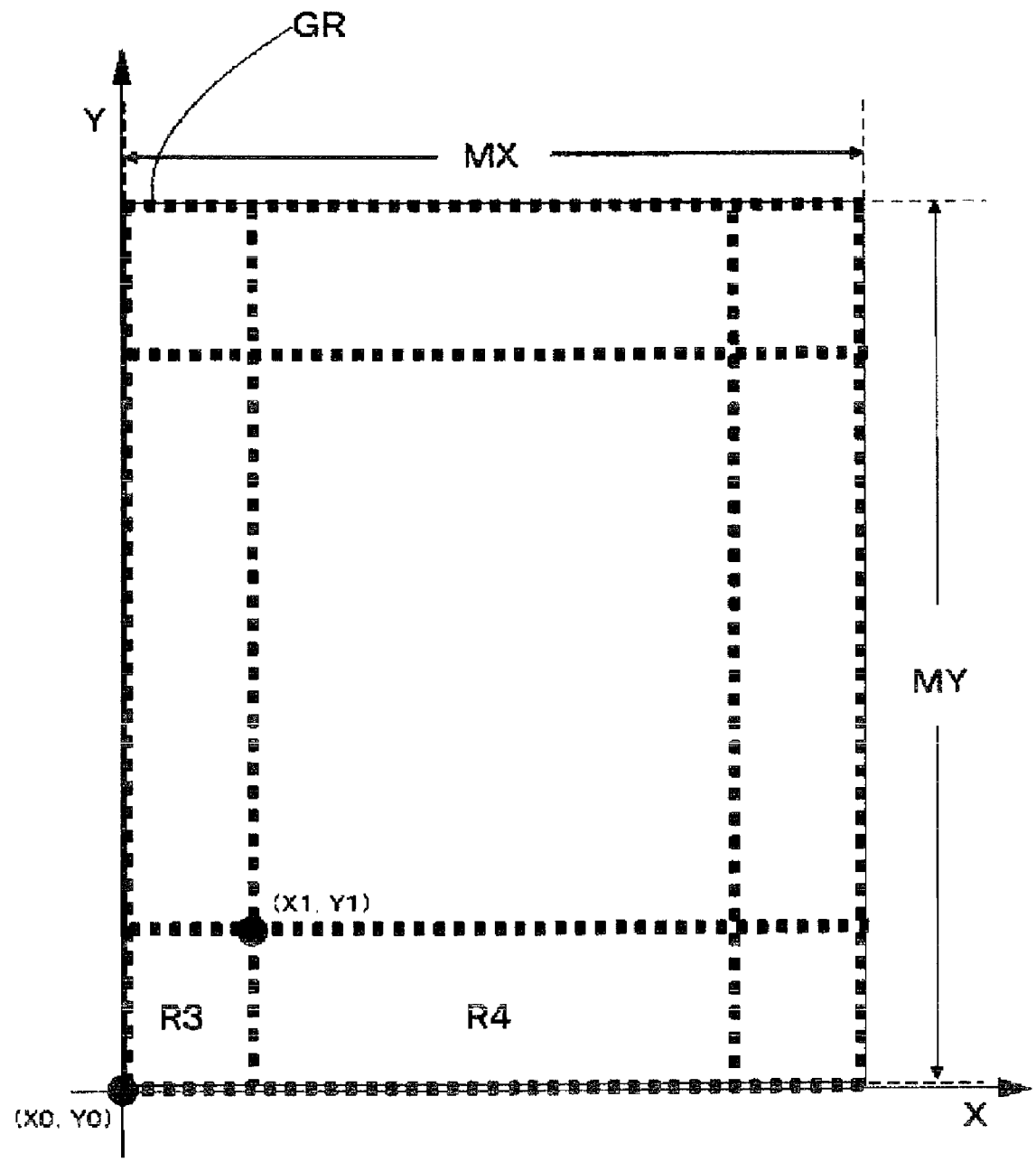
FIG. 9 illustrates a method for determining the position of each of unevenly sectioned segments in the image forming area in the segment sectioning process of the embodiment according to one or more aspects of the present invention.

Meanwhile, when it is determined that the added image is added into all the segments (S44: No), a calculation is made to determine the position of each of the segments on the image forming area GR (S47). FIG. 9 illustrates a method for calculating the position of each segment in the case where the number of the segments is determined to be 9, the uneven segmentation is selected, and the added image is added into all the segments. The position of a segment on the image forming area GR is represented by the X-Y coordinates of two diagonally-located vertexes of the segment. The coordinates of two vertexes of a segment R3 are (X0, Y0) and (X1, Y1). In order to determine the coordinates of the two vertexes, a calculation is made to determine the lengths of the segment R3 in the directions of X axis and Y axis. Lengths in the directions of X axis and Y axis are determined based on the image forming area GR determined based on the size of the recording sheet, the number of the segments in each of the main scanning direction and the auxiliary scanning direction, and a predetermined segmentation ratio employed when the uneven segmentation is selected. For example, when a recording sheet designated is of A4 size, the lengths of the image forming area GR in the main scanning direction and the auxiliary direction are assumed to be MX and MY, respectively. The number of the segments in the main scanning direction is "3," and in this case, a segmentation ratio is defined to be 1:4:1. Thus the length of the segment R3 in the main scanning direction is MX/6. In the same way, the length of the segment R3 in the auxiliary direction is MY/6. Therefore, when the vertex coordinates (X0, Y0) are defined as an original point (0, 0), the coordinates of the two vertexes of the segment R3 on the image forming area GR are determined to be (0, 0) and (MX/6, MY/6). Thereby, the position of the segment R3 on the image forming area GR is calculated.

In the same manner, the coordinates of two vertexes of a segment R4 are determined to be (MX/6, 0) and (5MX/6, MY/6). By applying the same calculation method to the other segments, the position of each segment is determined.

(Added Image Size Determining Process)

Figure 5:
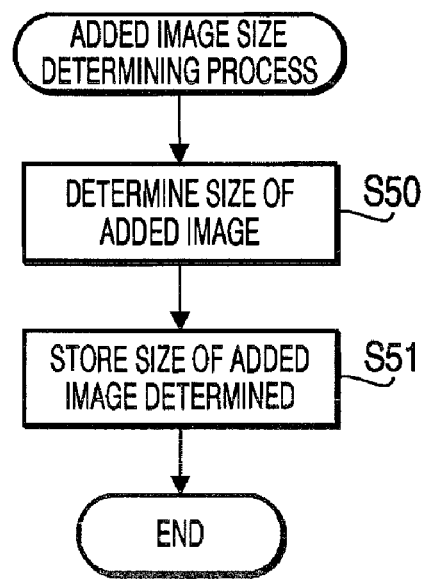
FIG. 5 is a flowchart showing an added image size determining process by the image forming device in the embodiment according to one or more aspects of the present invention.

Hereinafter, an added image size determining process will be described in detail with reference to FIG. 5. FIG. 5 is a flowchart showing a detailed procedure of the added image size determining process executed in S10.

In the added image size determining process, firstly, the X-Y coordinates of the position of two vertexes of each segment are read out of the segment data memory 83c, and the size of the added image to be added into each segment is determined based on the X-Y coordinates read out (S50).

Figure 10:
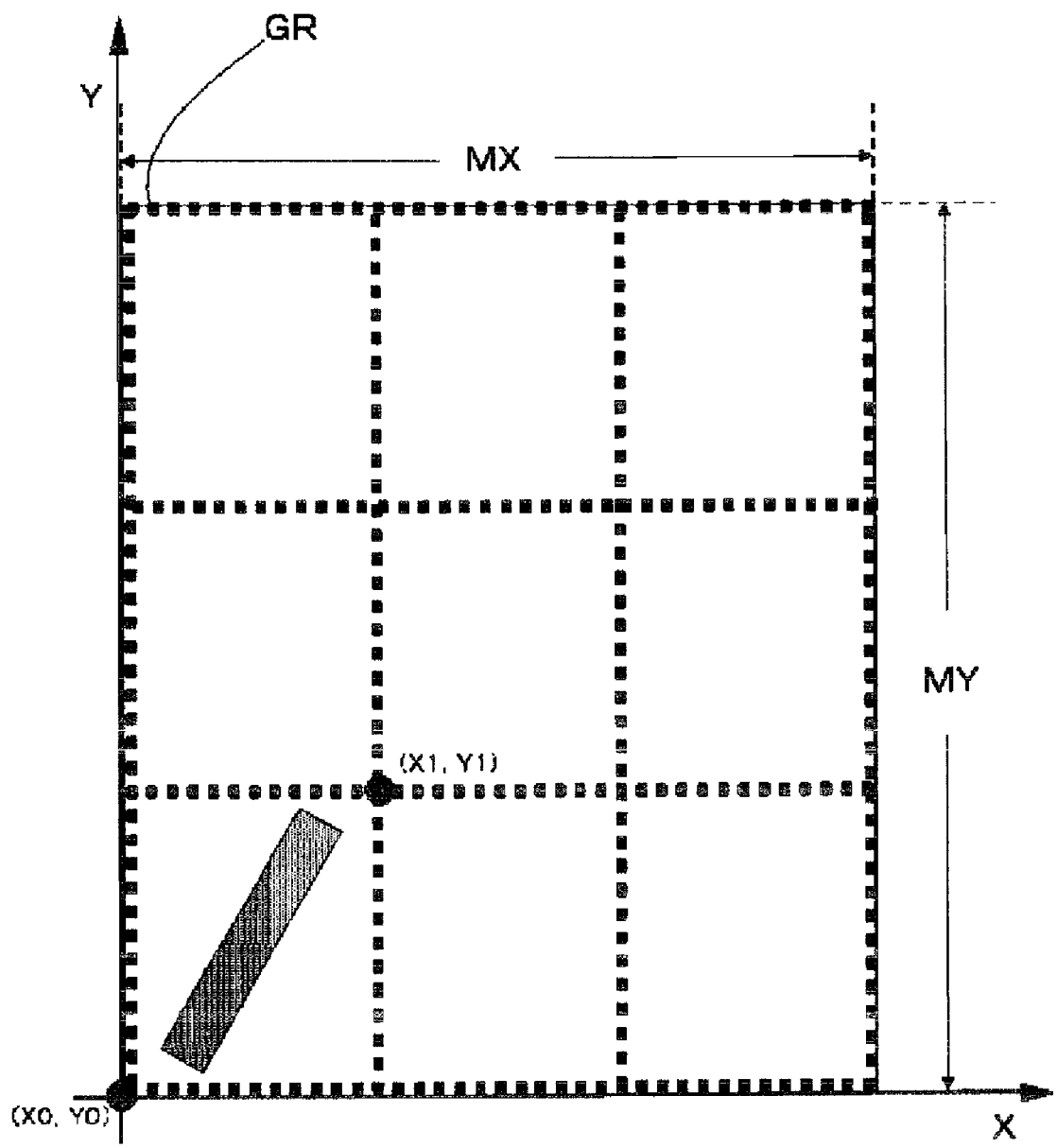
FIG. 10 illustrates a method for calculating the size of an added image in the added image size determining process of the embodiment according to one or more aspects of the present invention.

FIG. 10 illustrates a method for calculating the size of an added image WM in the case where the added image WM is added into the segment R1 stored in the segment data memory 83c in S43.

The coordinates of the two vertexes of the segment R1 stored in the segment data memory 83c in S43 are (0, 0) and (MX/3, MY/3). As described above, the added image is added into the segment R1 with the central coordinates of the segment R1 as a center. Therefore, the size of the added image WM is determined such that the added image WM fits within the segment R1 with the central coordinates (MX/6, MY/6) as a center, maintaining a horizontal to vertical ratio of the added image WM (S50). Further, when the added image WM is added into all the segments of different sizes, the size of the added image WM is determined to conform to the smallest segment.

Then, the determined size of the added image is stored into the added image size data memory 83d (S51). Thus, the size of the added image is determined, and the added image size determining process is terminated.

(Added Image Size Re-determining Process)

Figure 6:
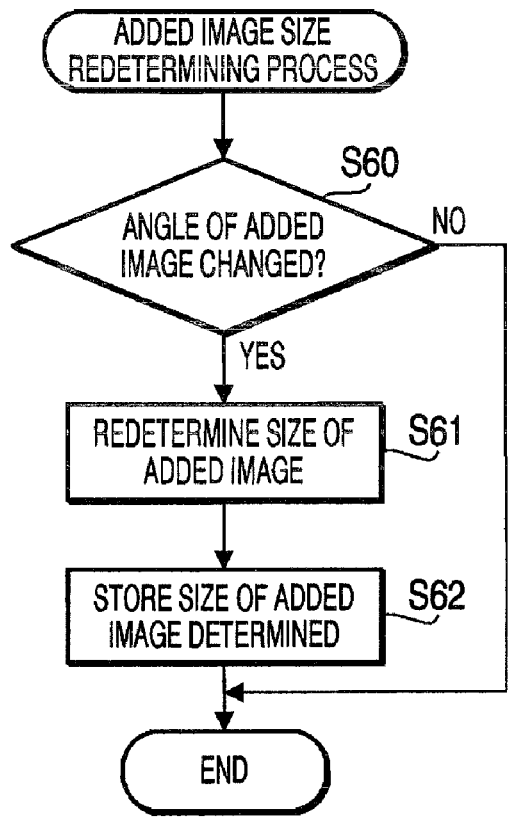
FIG. 6 is a flowchart showing an added image size redetermining process by the image forming device in the embodiment according to one or more aspects of the present invention.

Hereinafter, an added image size redetermining process of the embodiment will be described in detail with reference to FIG. 6. FIG. 6 is a flowchart showing a detailed procedure of the added image size redetermining process executed in S12.

In the added image size redetermining process, firstly, it is determined whether an angle is set for the added image in the various settings configuring process of S11 (S60). When it is determined that an angle is set for the added image (S60: Yes), the size of the added image stored in S51 is redetermined on the basis of the information on the angle (S61).

Figure 11A:
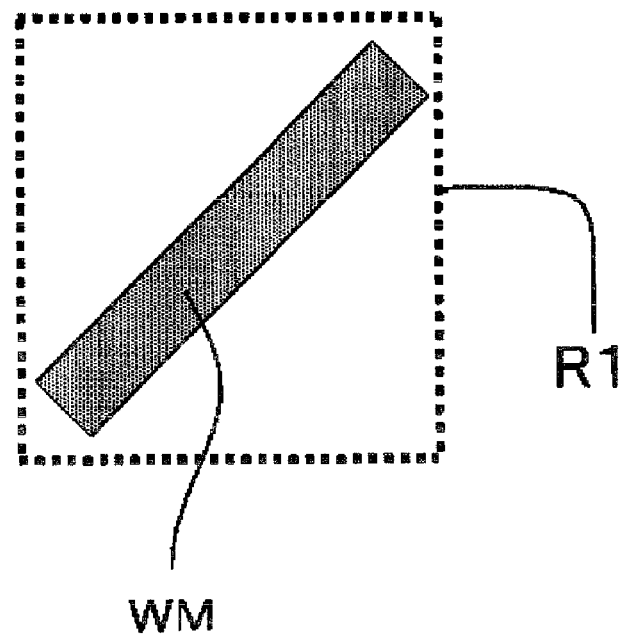
FIG. 11A shows an added image fitting within a segment in the embodiment according to one or more aspects of the present invention.
Figure 11B:
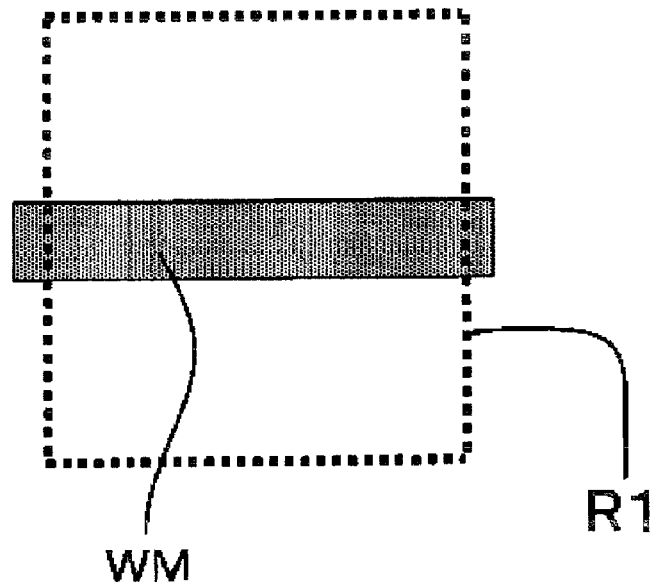
FIG. 11B shows the added image which is beyond the segment owing to an angle set for the added image in the embodiment according to one or more aspects of the present invention.

Here, FIGS. 11A and 11B illustrate a method for redetermining the size of the added image. FIG. 11A shows a situation where the added image WM stored in S51 is added into the segment R1 stored in the segment data memory 83c in S43. FIG. 11B shows a situation where the added image WM illustrated in FIG. 11A is rotated 45 degrees clockwise in the various settings configuring process of S11. The added image WM in FIG. 11B is beyond the segment R1 owing to the setting on the angle of the added image WM. Accordingly, the size of the added image is redetermined in the added image size redetermining process.

Then, the redetermined size of the added image is stored into the added image size data memory 83d (S62). Thus, the size of the added image is determined, and the added image size redetermining process is terminated.

Meanwhile, when it is determined that an angle is not set for the added image (S60: No), the size of the added image is not redetermined, and the added image size redetermining process is terminated.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiment, the image forming device 10 with the program for the main process incorporated therein has been described. However, for example, the program for the main process may be incorporated in a personal computer, which is configured to create a combined image by combining an added image and a main image created by the program for the main process.

In the aforementioned embodiment, the recording sheet designated is of A4 size. However, a recording sheet of A5 size or B5 size may be designated. The image forming area defined based on the size of the recording sheet varies depending on the size of the recording sheet. The size of the recording sheet may be designated by a user operation through the image forming device 10. Alternatively, the size of recording sheets loaded on a sheet tray may be detected by the image forming device 10.

In the aforementioned embodiment, the number of the segments is set to be 9. However, for example, the number of the segments in the main scanning direction may be set independently of the number of the segments in the auxiliary direction.

In the aforementioned embodiment, the main process shown in FIG. 3 proceeds to S27 and the following steps after the added image selected is stored in S26. However, after the added image selected is stored in S26, the main process may proceed to S6 and the following steps.

What is claimed is:

1. An image processing device configured to add, to a first image, a second image, comprising:
   an image acquiring unit configured to acquire the second image to be added;
   a segment sectioning unit configured to section, into a first plurality of segments, an image forming area in which the first image is allowed to be formed on a sheet, where there are at least two different segment sizes;
   a segment specifying unit configured to specify, from the first plurality of segments, a second plurality of segments into which the second image acquired is to be added;
   a size determining unit configured to determine a size of the second image such that the second image fits within a smallest segment of the specified second plurality of segments, based on position information of each segment of the specified second plurality of segments, the position information being defined on the image forming area for the first image, where the size of the second image added to each segment of the second plurality of segments is the same; and
   an image combining unit configured to create a combined image by adding the second image of the determined size to be formed in each segment of the specified second plurality of segments to the first image to be formed in the image forming area.

2. The image processing device according to claim 1, further comprising a position determining unit configured to determine the position information for each segment of the specified second plurality of segments.

3. The image processing device according to claim 1, wherein the segment specifying unit is configured to specify each of the first plurality of segments as the second plurality of segments into which the second image acquired is to be added.

4. The image processing device according to claim 1, wherein the size determining unit is configured to enlarge the size of the second image as far as the second image fits within the smallest segment of the specified second plurality of segments, when the second image is smaller than the smallest segment.

5. The image processing device according to claim 1, further comprising:
   an angle setting unit configured to set an angle of the second image relative to the first image; and
   a size redetermining unit configured to redetermine the size of the second image such that the second image fits within the smallest segment of the specified second plurality of segments when the set angle of the second image relative to the first image is applied.

6. A method for adding, to a first image, a second image, comprising:
   an image acquiring step of acquiring the second image to be added;
   a segment sectioning step of sectioning, into a first plurality of segments, an image forming area in which the first image is allowed to be formed on a sheet, where there are at least two different segment sizes;
   a segment specifying step of specifying, from the first plurality of segments, a second plurality of segments into which the second image acquired is to be added;
   a size determining step of determining a size of the second image such that the second image fits within a smallest segment of the specified second plurality of segments, based on position information of each segment of the specified second plurality of segments, the position information being defined on the image forming area for the first image, where the size of the second image added to each segment of the second plurality of segments is the same; and
   an image combining step of creating a combined image by adding the second image of the determined size to be formed in each segment of the specified second plurality of segments to the first image to be formed in the image forming area.

7. A non-transitory computer readable medium having computer readable instructions stored thereon for adding, to a first image, a second image, the instructions causing a computer to perform:
   an image acquiring step of acquiring the second image to be added;
   a segment sectioning step of sectioning, into a first plurality of segments, an image forming area in which the first image is allowed to be formed on a sheet, where there are at least two different segment sizes;
   a segment specifying step of specifying, from the first plurality of segments, a second plurality of segments into which the second image acquired is to be added;
   a size determining step of determining a size of the second image such that the second image fits within a smallest segment of the specified second plurality of segments, based on position information of the each segment of the specified second plurality of segments, the position information being defined on the image forming area for the first image, where the size of the second image added to each segment of the second plurality of segments is the same; and
   an image combining step of creating a combined image by adding the second image of the determined size to be formed in each segment of the specified second plurality of segments to the first image to be formed in the image forming area.

8. The image processing device according to claim 1, further comprising an image forming unit configured to form, on the sheet, the combined image created by the image combining unit.

9. The image processing device according to claim 1, wherein the image acquiring unit is configured to externally acquire the second image to be added.

10. The image processing device according to claim 1, further comprising a scanner configured to scan an image,
    wherein the image acquiring unit is configured to acquire, from the scanner, the second image to be added.

11. A method for adding, to a first image, a second image, comprising:
    an image acquiring step of acquiring the second image to be added;
    a segment sectioning step of sectioning, into a plurality of segments, an image forming area in which the first image is allowed to be formed on a sheet;
    a segment specifying step of specifying, from the plurality of segments, at least one segment into which the second image acquired is to be added;
    a size determining step of determining a size of the second image such that the second image fits within the at least one segment specified, based on position information of the at least one segment specified, the position information being defined on the image forming area for the first image; and
    an image combining step of creating a combined image by adding the second image of the determined size to be formed in the at least one segment to the first image to be formed in the image forming area.

12. A non-transitory computer readable medium having computer readable instructions stored thereon for adding, to a first image, a second image, the instructions causing a computer to perform:

an image acquiring step of acquiring the second image to be added;

a segment sectioning step of sectioning, into a plurality of segments, an image forming area in which the first image is allowed to be formed on a sheet;

a segment specifying step of specifying, from the plurality of segments, at least one segment into which the second image acquired is to be added;

a size determining step of determining a size of the second image such that the second image fits within the at least one segment specified, based on position information of the at least one segment specified, the position information being defined on the image forming area for the first image; and an image combining step of creating a combined image by adding the second image of the determined size to be formed in the at least one segment to the first image to be formed in the image forming area.

* * * * *